(12) United States Patent  (10) Patent No.: US 7,150,468 B2
Pan  (45) Date of Patent: Dec. 19, 2006

(54) INFLATABLE HEAD RESTRAINT

(76) Inventor: James Y. M. Pan, PO Box 82-144, Taipei (TW)

( * ) Notice: Subject to any disclaimer, the term of this patent is extended or adjusted under 35 U.S.C. 154(b) by 21 days.

(21) Appl. No.: 10/274,140

(22) Filed: Oct. 21, 2002

(65) Prior Publication Data

US 2004/0075252 A1    Apr. 22, 2004

(51) Int. Cl.
B60R 21/16 (2006.01)
B60R 21/20 (2006.01)
B60R 21/26 (2006.01)
B60R 21/231 (2006.01)

(52) U.S. Cl. .................................................. 280/730.1

(58) Field of Classification Search ............ 280/730.1, 280/730.2
See application file for complete search history.

(56) References Cited

U.S. PATENT DOCUMENTS

| 3,953,049 | A | * | 4/1976 | Surace et al. ............ 280/730.1 |
| 5,588,671 | A | * | 12/1996 | Boumarafi et al. ...... 280/730.2 |
| 5,833,312 | A | * | 11/1998 | Lenz ..................... 297/216.13 |
| 5,865,463 | A | * | 2/1999 | Gagnon et al. ............ 280/735 |
| 6,331,014 | B1 | * | 12/2001 | Breed ...................... 280/730.1 |
| 6,572,137 | B1 | * | 6/2003 | Bossecker et al. ....... 280/730.1 |
| 6,581,961 | B1 | * | 6/2003 | Bowers ..................... 280/735 |
| 6,805,404 | B1 | * | 10/2004 | Breed .................... 297/216.12 |
| 6,893,045 | B1 | * | 5/2005 | Inoue et al. ............... 280/753 |
| 6,938,920 | B1 | * | 9/2005 | Inoue et al. ............. 280/730.2 |
| 2002/0014760 | A1 | * | 2/2002 | Bossecker et al. ....... 280/730.1 |

* cited by examiner

Primary Examiner—Faye M. Fleming
Assistant Examiner—Joselynn Y. Sliteris
(74) Attorney, Agent, or Firm—Leong C. Lei

(57) ABSTRACT

An inflatable head restraint device for vehicle is disclosed. An inflatable head restraint device comprising an inflatable air bag, an inflation device, a sensing device, characterized in that the inflatable air bag can be deployed to be a U-shaped cushion for restraining the head and neck and back portion of an occupant, preventing whiplash injury from either rear, front or side impact crash.

1 Claim, 10 Drawing Sheets

INFLATABLE HEAD RESTRAINT

BACKGROUND OF THE INVENTION (a) Technical Field of the Invention

The present invention relates to an inflatable head restraint device for a vehicle seat, and in particular, a device for restraining the head and neck and backbone portion of an occupant, preventing injury to the head and neck from either rear, front or side impacted crash.

(b) Description of the Prior Art

The head restraint device developed by SAAB makes use of a linking rod connected to a trigger board on the seat back. When a rear impact happens to the car, the trigger board will be pushed backward by the jolt of occupant's body which moves the headrest downward to hold the head portion of a passenger to minimize injuries. The WHIPS device developed by Volvo makes use of pendulum-like backward and downward moment of the headrest and the seat back, and in particular the headrest will be moved backward to hold the head of the passenger so as to minimize the impact force exerted to the neck portion. The backward movement of the seat back and the headrest is in two stages. First, the parallel backward movement of the sea back and the headrest, and then the seat back will be slightly tilted at the second stage. However, the head restraint of those conventional designs provides only the buffering protection to the head for rear impact. There is still lack of protection for head and neck from all aspects to the front, rear or lateral impact. Accordingly, it is an object of the present invention to provide a head restraint device for a vehicle seat, which mitigates the above drawbacks.

SUMMARY OF THE INVENTION

Accordingly, it is an object of the present invention to provide an inflatable head restraint device for a vehicle seat, wherein an inflatable air bag is deployed from the headrest and seat back serving as a buffering effect to restrain the head, neck and backbone portion of a passenger preventinginjury from either a front or rear impact.

A second object of the present invention is to provide an inflatable head restraint device for a vehicle seat, wherein the side wing of the inflatable air bag is deployed to restrain he head and neck of the passenger preventing injury from the sudden jolt when a lateral impact happens.

A third object of the present invention is to provide an inflatable head restraint device for a vehicle seat, wherein the extended tag bag portion of the inflatable air bag is deployed offering a better support for the back and the neck portion from injury.

A fourth object of the present invention is to provide an inflatable head restraint device wherein the inflatable air bag is folded and repacked in order for re-use.

A fifth object of the present invention is to provide an inflatable head restraint device wherein the deployment of the inflatable bag can be initiated by a sudden pull of the seat belt, caused by an abrupt forward thrust of the occupant's body.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Identical reference numerals are used throughout the specification and drawings to refer the identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

Figure 1:
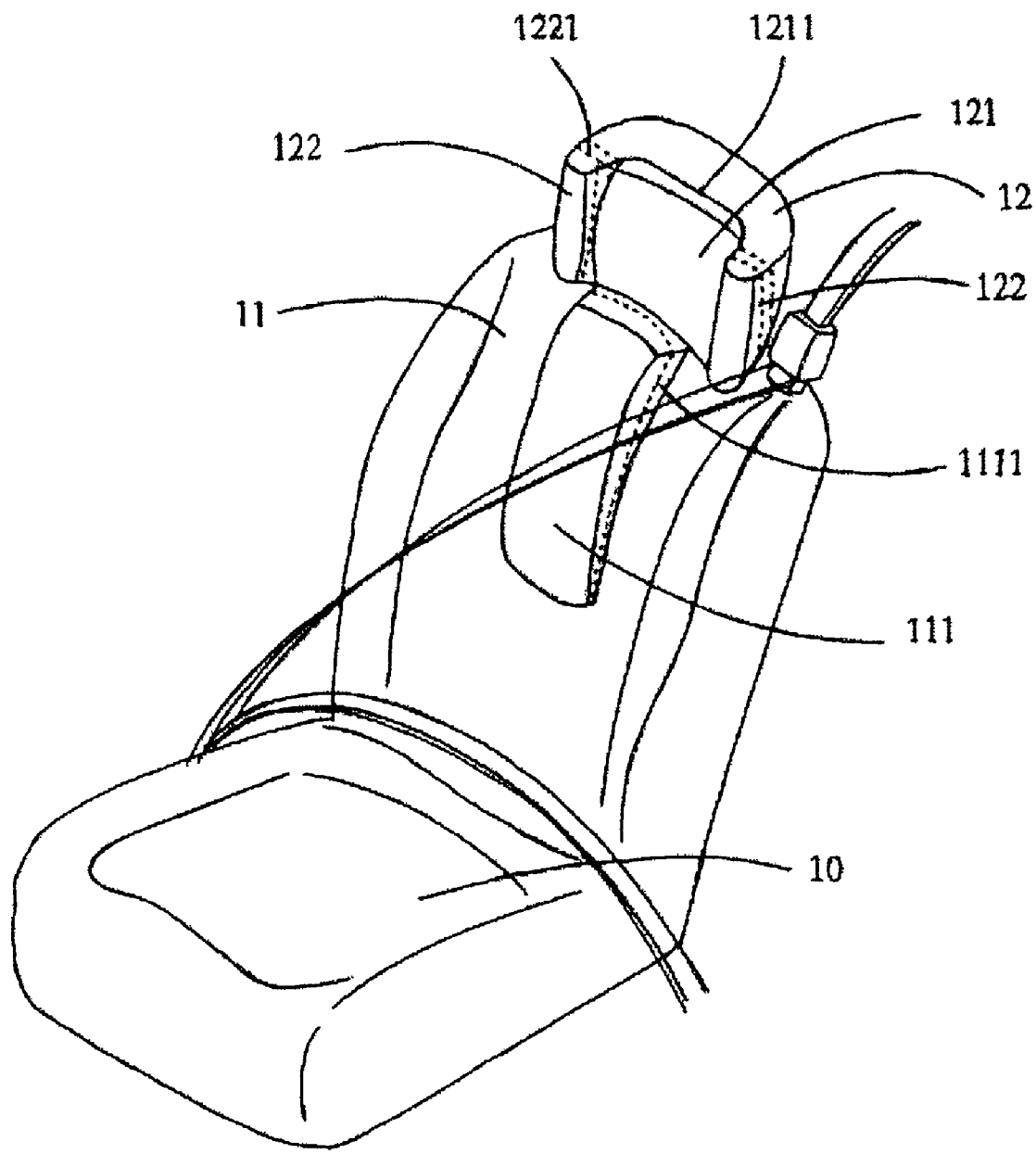
FIG. 1 is a perspective view of the present invention.

| DRAWING REFERRENCE NUMERALS: | |
|---|---|
| seat 10 | sensing box 30 |
| back 11 | double ends torsion spring 31 |
| headrest 12 | axis gear 32 |
| head bag 121 | channel 33 |
| side bags 122 | trigger gear 34 |
| extended tag bag 111 | linking cable 35 |
| seams 1211, 1221 and 1111 | seat belt 40 |
| pressurized gas cylinder 20 | electric switch 50 |
| inflation tubes 213, 223, 233 | trigger rod 51 |
| controllable valve 21 | electrical controllable release valve 52 |
| trigger 211 | cable 53 |
| tension spring 212 | |
| anchor plate 2130 | |

DETAILED DESCRIPTION OF THE PREFERRED EMBODIMENT

For the purpose of enhancing an understanding of the principles of the invention, reference will now be made to the embodiment illustrated in the drawings. Specific terms will be used to describe the same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

Figure 2:
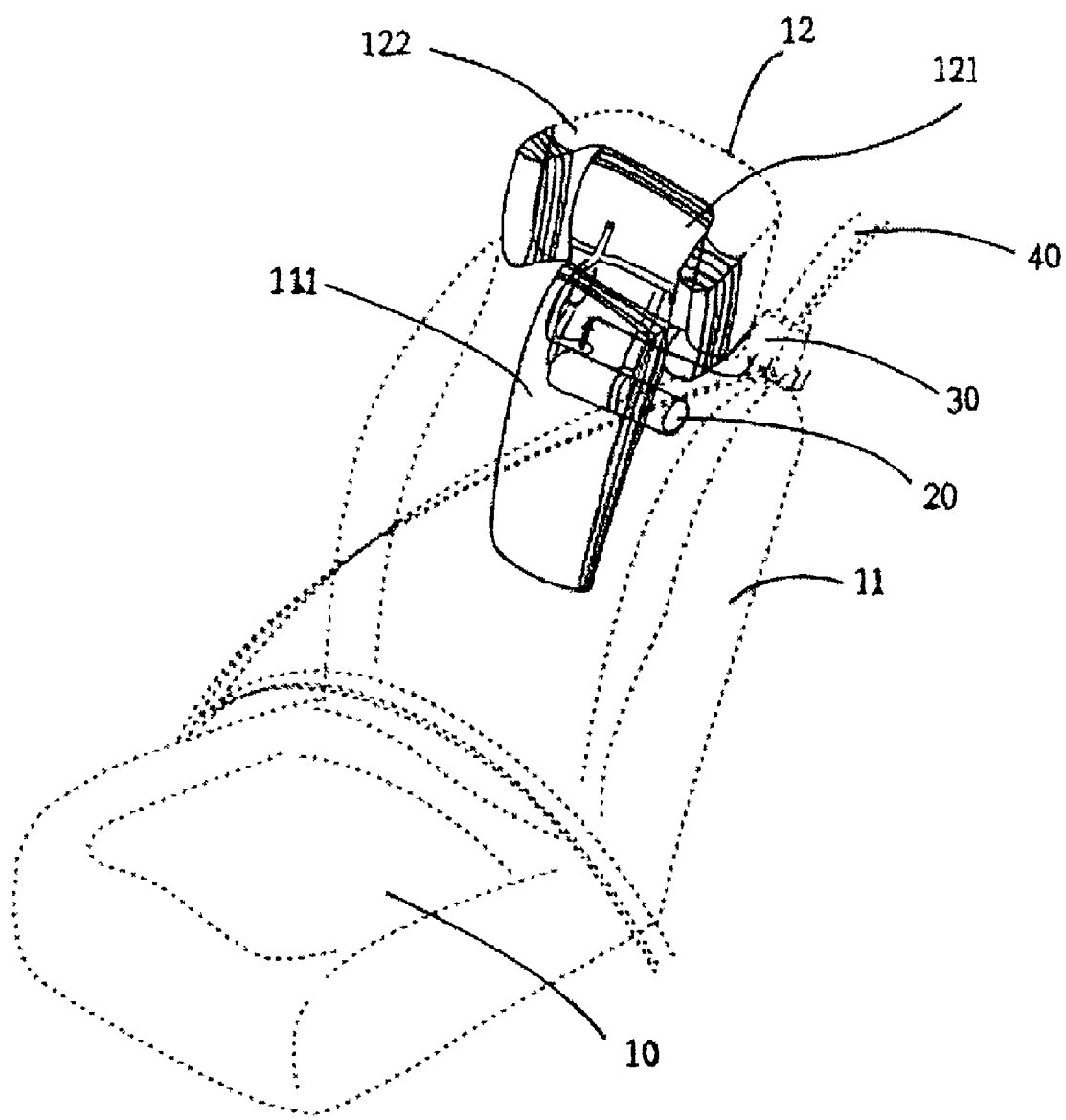
FIG. 2 is a perspective view showing the interior parts of the present invention.
Figure 3:
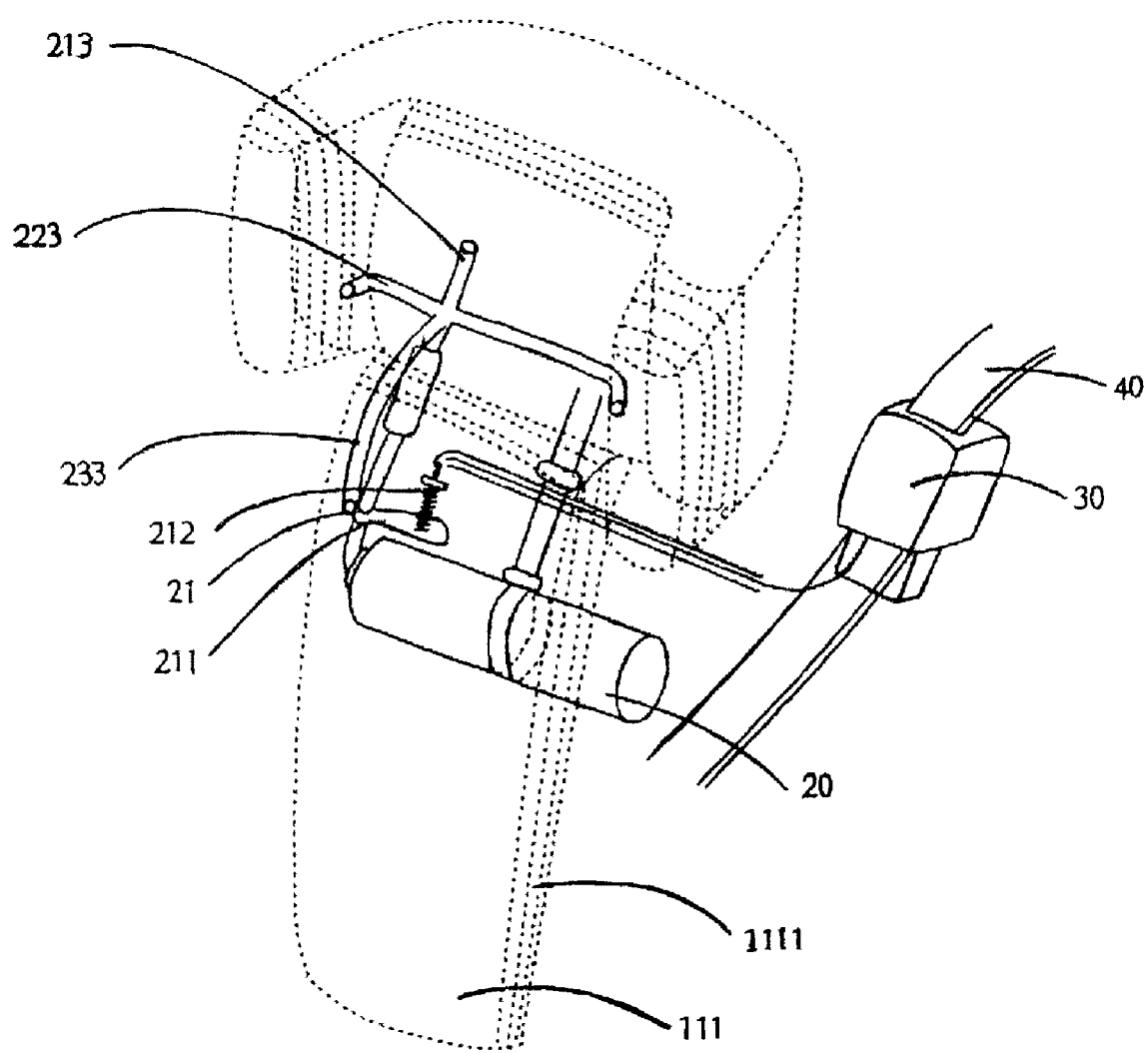
FIG. 3 is a perspective view showing the interior structure of the present invention.
Figure 3A:
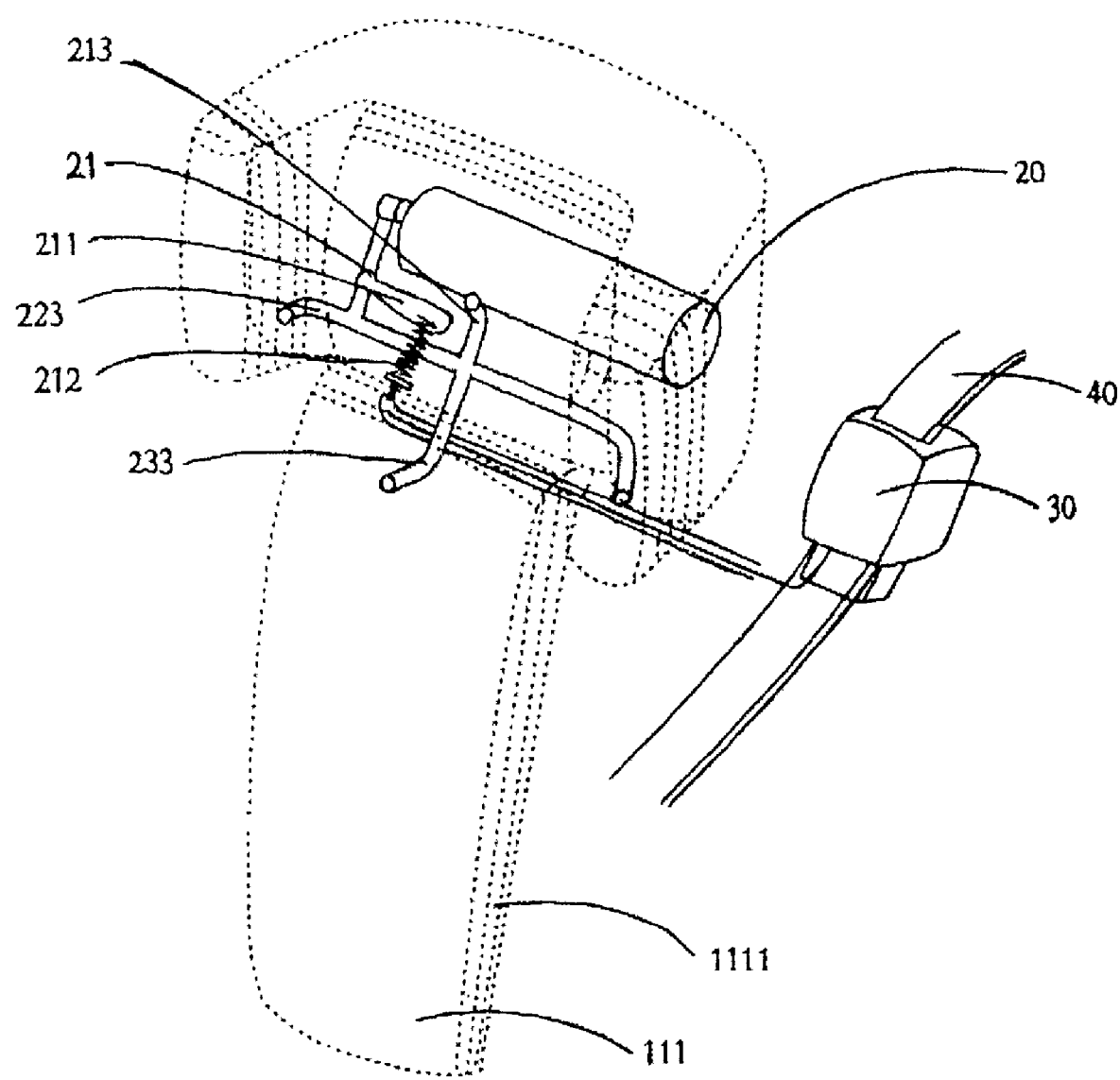
FIG. 3A is a perspective view showing a compact arrangement of the interior structure of the present invention.

The term "inflatable head restraint" is defined as an inflatable device that is mounted at the headrest and the back of a vehicle seat is set to be able to be inflated as a cushion to restrain the head and neck portion of a passenger when an impact happens. The device may comprise of a cushion device (e.g. inflatable air bag), an inflation device (e.g. pressurized gas cylinder) and a sensing device. FIGS. 1 and 2 show a preferred embodiment of an inflatable air bag, mounted onto the headrest 12 and the back 11 of seat 10. The inflatable air bag comprises a head bag 121, a pair of side bags 122 and an extended tag bag 111. The head bag 121 and a pair of side bags 122 is folded and mounted into the headrest 12 to form a U-shape head portion. The extended tag bag 111 is a downward extension from the head bag 121 and mounted onto the upper center part of the seat back near the headrest 12, allowing the backbone of occupant to be closely leaned against thereto. All these air bags 121, 122 and 111 are folded in a pattern that can be easily reassembled and packed inside the headrest 12 for re-use, as shown on FIGS. 2 and 6. Resealable fasteners are used as the seams 1211, 1221 and 1111 to seal said packed airbags 121, 122 and 111 to allow for repeated use. Said air bags 121, 122 and 111 are connected to a pressurized gas cylinder 20 by inflation tubes 213, 223 and 233, Said pressurized gas cylinder 20 can be disposed inside the headrest 12 or the seat back 11, as shown on FIGS. 3 and 3A. A controllable valve 21 is provided at the nozzle the pressurized gas cylinder 20 to control the release of the air. A seat belt pulling force sensing box 30, housing the seat belt 40, is mounted at the shoulder of the seat back 11. Once a sudden and strong pulling force of the seat belt exceeds a certain preset threshold, the sensing box 30 will initiate the opening of the valve 21 promptly to release the air. Alternatively, the sensing device as the conventional air bag equipped can be connected to the valve 21, so at the controllable valve 21 of the inflatable head restraint device can be ignited as the conventional air bag system does.

Figure 4A:
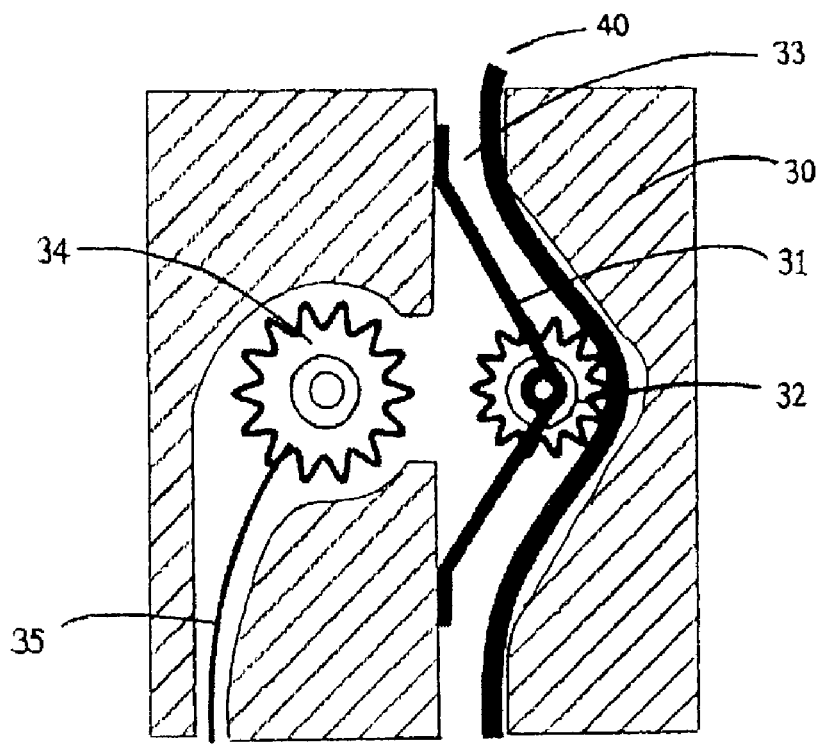
FIG. 4A is a schematic view showing the interior structure of the sensing box at normal condition in accordance with the present invention.
Figure 5A:
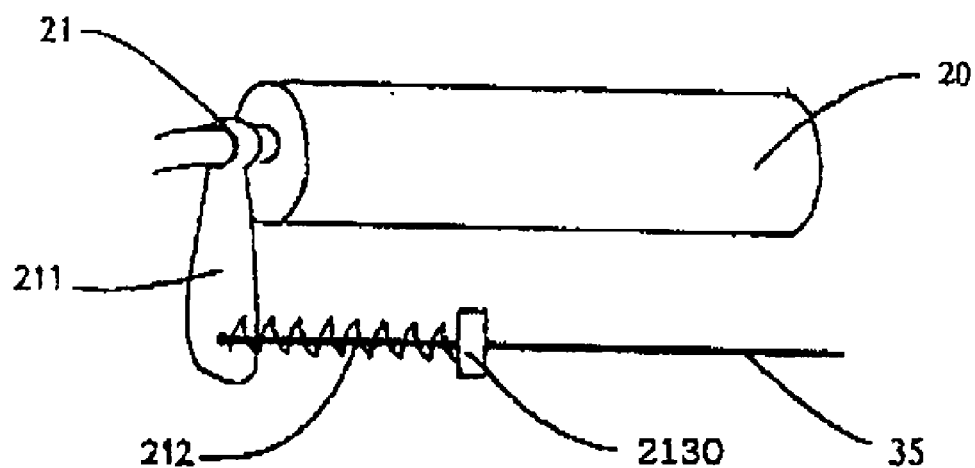
FIG. 5A is a schematic view showing the trigger system of the inflation device at normal condition in accordance with the present invention
Figure 5B:
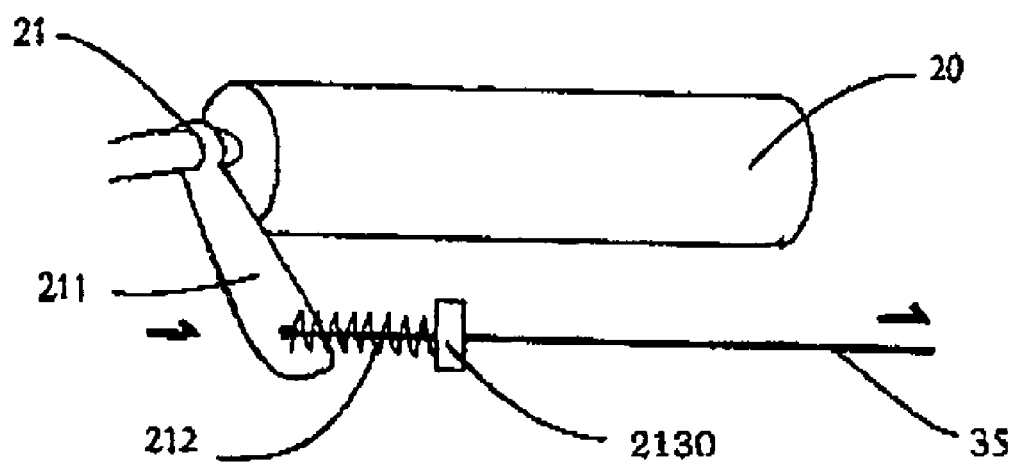
FIG. 5B is a schematic view showing the trigger system of the inflation device in action in accordance with the present invention.

FIG. 4A shows the sensing box 30 comprises a double ends torsion spring 31 with an axis gear 32 setting through the center of its axis. Said seat belt 40 slides through the channel 33 between the inner wall of the sensing box 30 and the torsion spring 31, and winds around the axis gear 32. The elasticity of the torsion spring 31 was set to allow the sliding of the seat belt 40 within normal pulling force. A trigger gear 34 bound by a linking cable 35 is set in front, but at a distance from the said axis gear 32. As shown on FIGS. 5A and 5B, said linking cable 35 connects to the trigger 211 of the control valve 21 of pressurized gas cylinder 20 through the center of the coil of a tension spring 212. Said tension spring 212 is fixed to an anchor plate 2130 and pushes said trigger 211 of the control valve 21 to keep the pressurized gas cylinder 20 in a close status at normal condition.

Figure 4B:
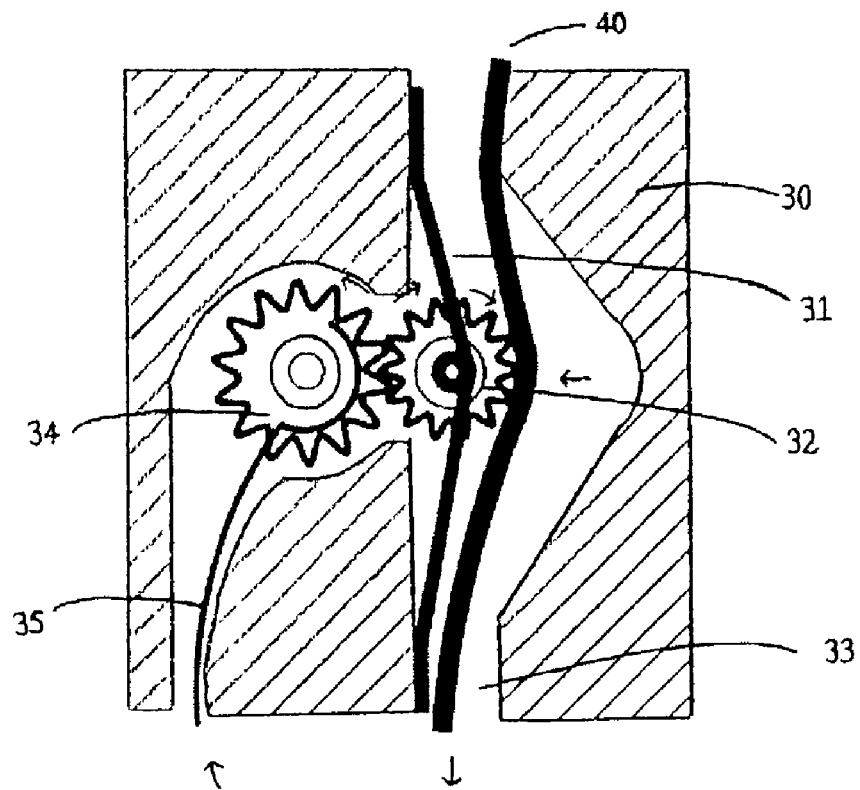
FIG. 4B is a schematic view showing the interior structure of the sensing box in action in accordance with the present invention.
Figure 6A:
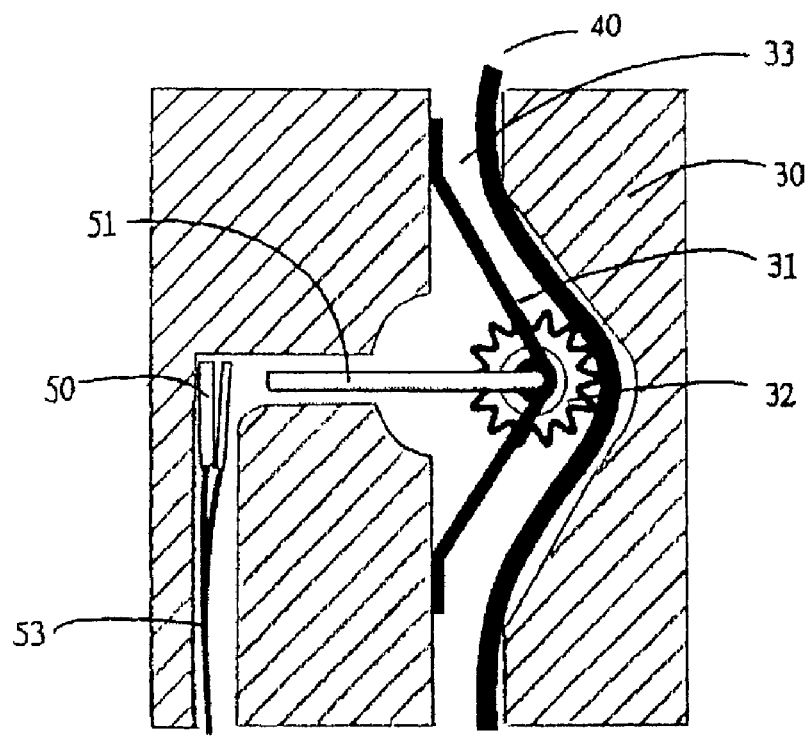
FIG. 6A shows an alternative electric sensing box at normal condition in accordance with the present invention.
Figure 6B:
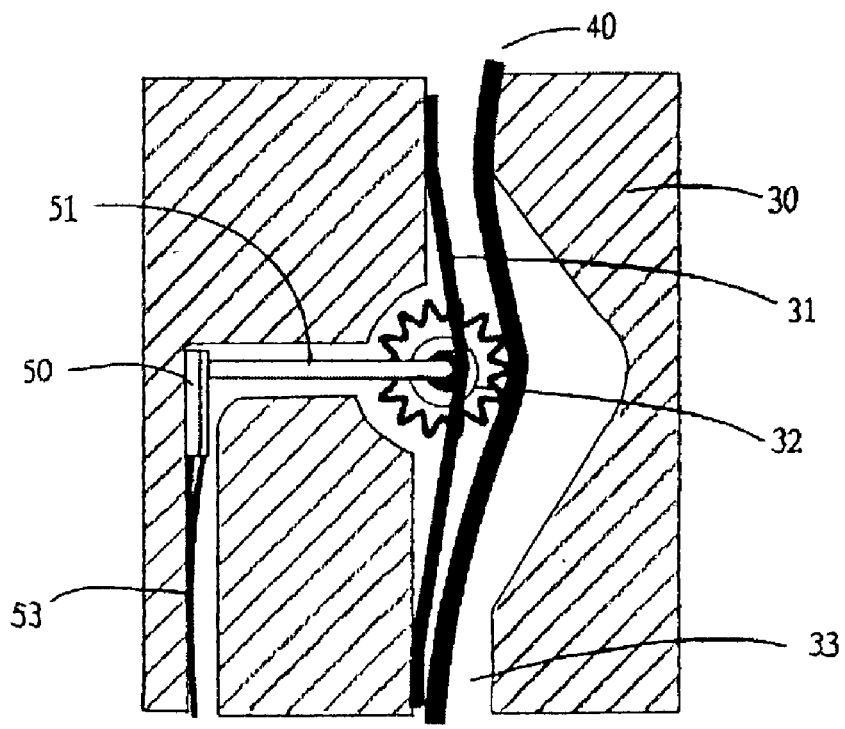
FIG. 6B shows an alternative electric sensing box in action in accordance with the present invention.
Figure 6C:
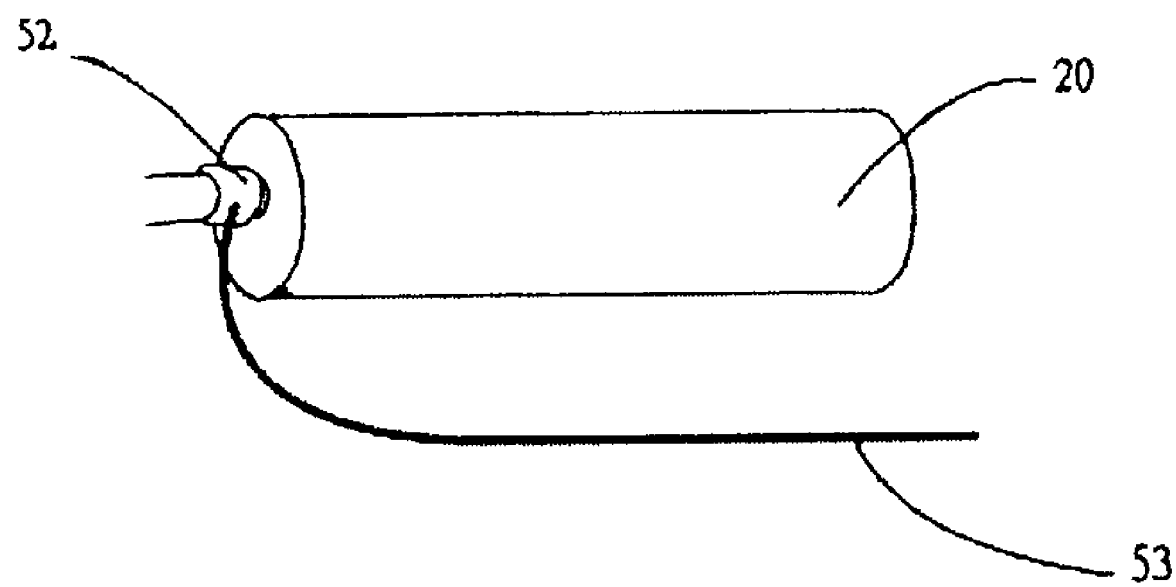
FIG. 6C is a schematic view showing the trigger system of the inflation device that matches with the electric sensing box in accordance with the present invention.
Figure 7:
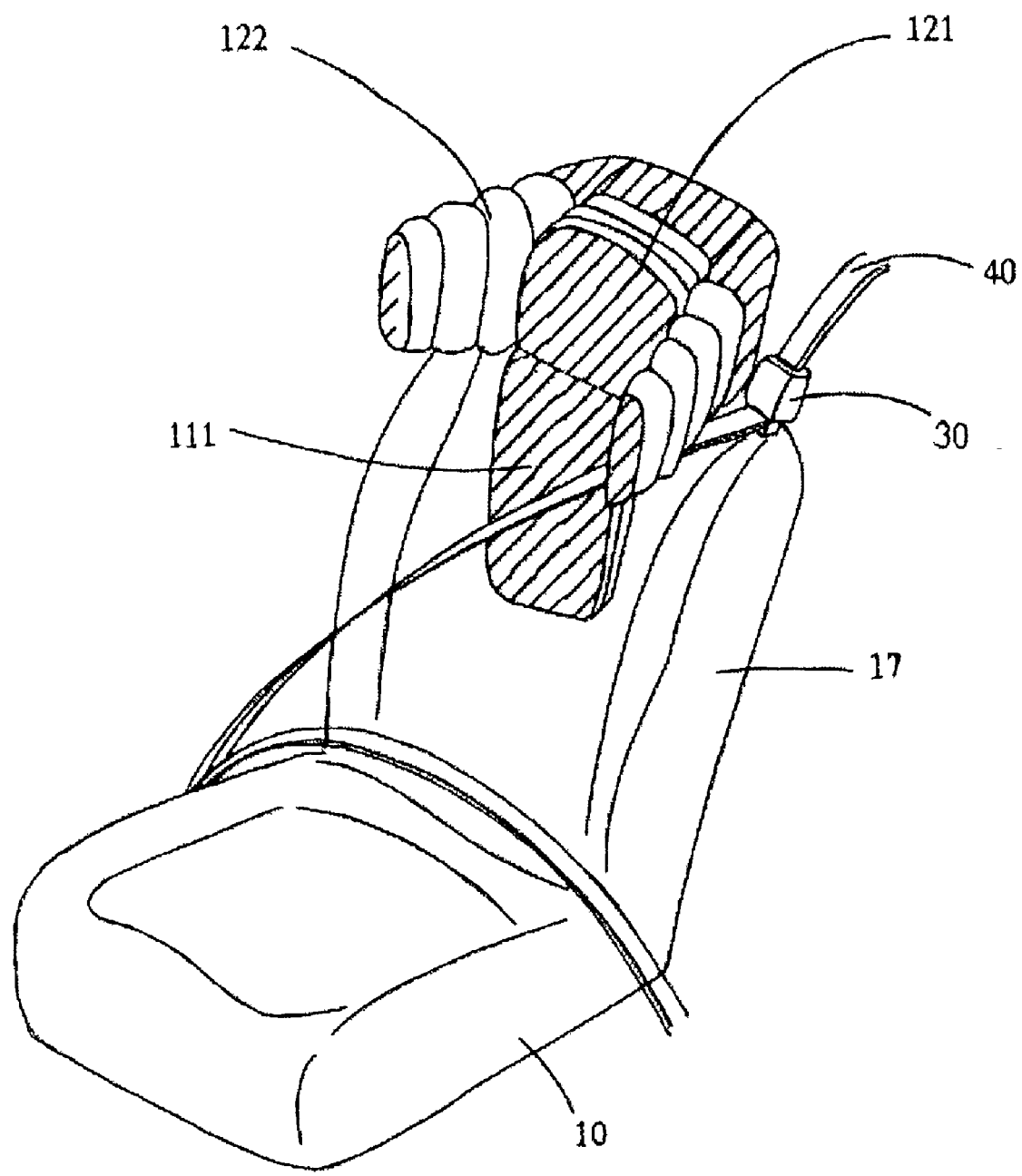
FIG. 7 is a perspective view of the deployed air bag in accordance with the present invention.
Figure 8A:
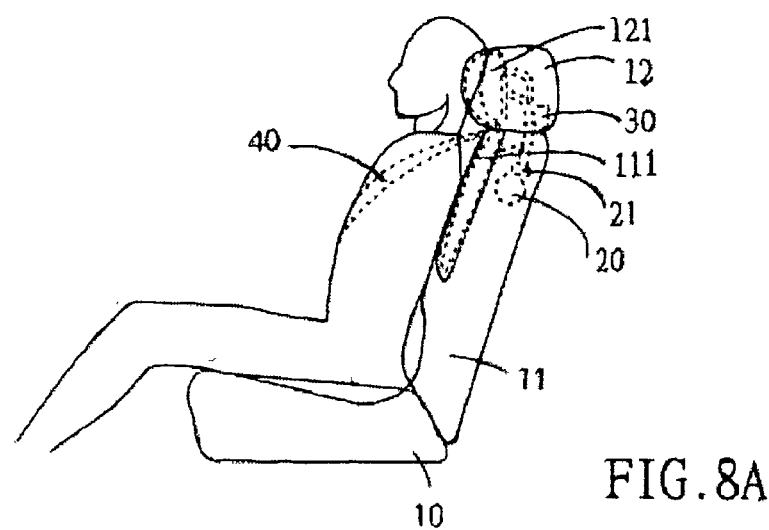
FIGS. 8A, 8B and 8C are schematic views showing the series action of the present invention during vehicle being crashed.
Figure 8B:
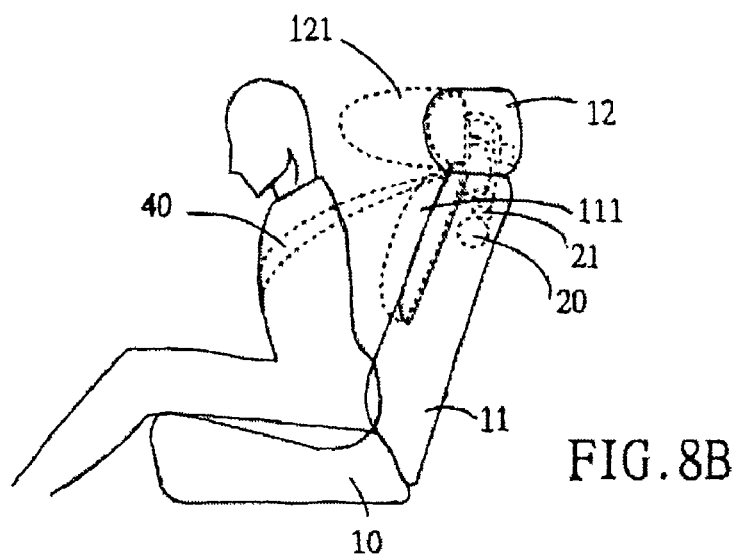
Figure 8C:
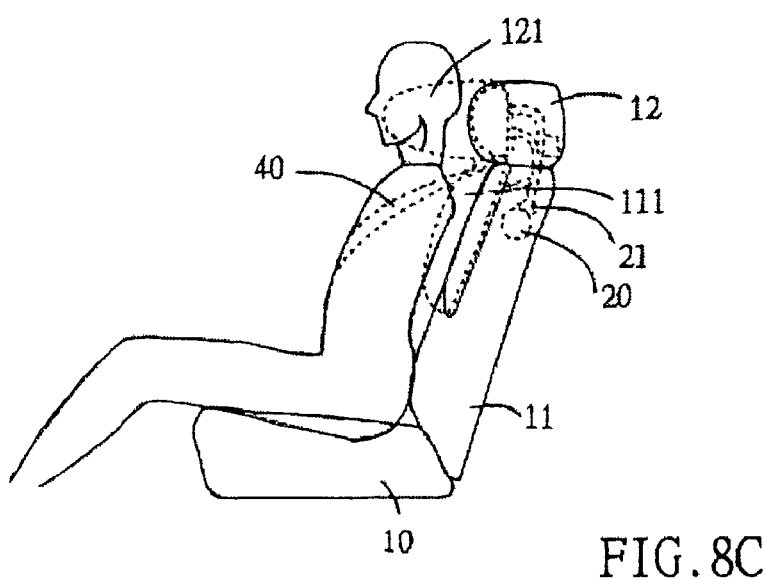

Referring to FIGS. 4A and 4B, when an impact happens to the car, the seat belt 40 would sustain a sudden force due to the abrupt forward thrust of the occupant's body. Once force is greater than the preset threshold of the said torsion spring 31, the seat belt 40 that is wound around the said torsion spring 31 would be pulled straight and push the axis gear 32 in contact with the trigger gear 34. When the was gear 32 and the trigger gear 34 are in contact, the pulling of the seat belt 40 will drive the trigger gear 34 to wind the linking cable 35, consequently, pulling the trigger 211 of the control valve 21 to open and release the air from the pressurize gas cylinder 20. Thus the air will be promptly released from the pressurized gas cylinder 20 to deploy the air bags 111, 121 and 122 through the inflation tubes 213, 223 and 233. In accordance with the present invention, alternative sensing initiation mechanism can be used such as: electric switch 50 as shown in FIGS. 6A, 6B and 6C or the conventional sensing system for airbag. Once the pulling force is greater than the preset elastic threshold of the said torsion spring 31, trigger rod 51 of the axis gear 32 will be pushed to press the electric switch 50 and initiate an electric signal to the electrical controllable release valve 52 through a cable 53 to open and release the air from the pressurized gas cylinder 20. Referring to FIGS. 7, 8A, 8B and 8C, when an impact happens to the car, the seat belt 40 will be pulled forward due to the inertia force of the passenger, once the pulling force of the seat belt is stronger than the preset elastic threshold of the torsion spring 31, the axis gear 32 is pressed to be in contact with the trigger gear 34, thus drives the trigger gear 34 and winds the linking cable 35. Consequently, the pulling of the seat belt will initiate the opening of the controllable valve 21 to release the air from the pressurized gas cylinder 20 and deploy the air bags 111, 121 and 122 trough the inflation tubes 213, 223. The head bag 121 and the pair of side bags 122 form a U-shaped cushion serving as a buffering effect to protect the head and neck portion of a passenger from y induced by either a front or rear impact; said pair of side bags 122 is designed to further protect the head and neck of the passenger from injury by the lateral thrust when a side impact happens; the extended tag bag 111 will offer a better support for the backbone and the neck portion from injury. All these air bags 121, 122 and 111 are characterized in folding in a pattern that can be easily folded back and repacked inside the headrest 12 for re-use.

It will be appreciated by person skilled in the art that the present invention is not limited by what has been particularly shown and described hereinabove. Rather the scope of the present invention includes both combinations and sub combinations of the features described hereinabove as well as modifications and variations thereof which would occur to a person skill in the art upon reading the foregoing description and which are not in the prior art.

I claim:

1. An inflatable head restraint device for mounting on a headrest and back of a seat having a seat belt, comprising:

a cushion device comprising a head bag, a pair of side bags and an extended tag bag, said bags being inflation bags, said head bag and side bags being mounted into a headrest and capable of expanding into a U-shaped head portion, said extended tag bag being a downward extension from said head bag and fitted into an upper center part of said back;

an inflation device which is a pressurized gas cylinder, said pressurized gas cylinder being connected to said air bags by inflation tubes and disposed within said headrest, said pressurized gas cylinder being provided with a control valve for releasing air; and a seat belt pulling force sensing device mounted at a shoulder of a seat back, said sensing device being provided with a channel in which are mounted a torsion spring and an axis gear mounted at a center of said torsion spring, a seat belt passing through said channel between an inner wall of said channel and said axis gear, a trigger gear being arranged in said sensing device and connected with said control valve via a linking cable, a spring being put over said linking cable and mounted between said control valve and an anchor plate;

whereby when an impact happens to a car, said seat belt will be pulled forward due to inertia force of a passenger, and once pulling force of said seat belt is stronger than preset elastic threshold of said torsion spring, said axis gear is pressed to be in contact with said trigger gear thereby driving said trigger gear and winding up said linking cable and therefore vigorously pulling said seat belt to initiate opening of said control valve to release air from said pressurized gas cylinder and deploy said bags through said inflation tubes, so that said head bag and said side bags are expanded to form a U-shaped cushion to protect a head of said passenger and a neck portion of said passenger from whiplash injury.

* * * * *